United States Patent
Buecker

Patent Number: 5,973,674
Date of Patent: Oct. 26, 1999

[54] INPUT DEVICE FOR CONTROLLING CURSOR MOVEMENT ON THE SCREEN OF A COMPUTER

[76] Inventor: Robert Scott Buecker, 654 Owens Ct., Wilmington, N.C. 28412

[21] Appl. No.: 08/896,503

[22] Filed: Aug. 2, 1997

[51] Int. Cl.⁶ .................................................. G06F 3/033
[52] U.S. Cl. ........................................................... 345/166
[58] Field of Search .................................... 345/157, 161, 345/163, 166

[56] References Cited

U.S. PATENT DOCUMENTS

| | | | |
|---|---|---|---|
| 3,761,919 | 9/1973 | Baumann | 340/365 P |
| 4,092,532 | 5/1978 | Hayes | 250/221 |
| 4,250,378 | 2/1981 | Mutton | 250/221 |
| 4,459,578 | 7/1984 | Sava et al. | 338/128 |
| 4,520,240 | 5/1985 | Swindler | 345/157 |
| 4,670,743 | 6/1987 | Zemke | 340/709 |
| 4,751,505 | 6/1988 | Williams et al. | 340/710 |
| 4,794,384 | 12/1988 | Jackson | 340/710 |
| 4,856,785 | 8/1989 | Lantz et al. | 273/148 B |
| 4,880,967 | 11/1989 | Kwang-Chien | 250/221 |
| 4,983,786 | 1/1991 | Stevens et al. | 178/18 |
| 5,355,148 | 10/1994 | Anderson | 345/166 |
| 5,508,719 | 4/1996 | Gervais | 345/157 |
| 5,543,592 | 8/1996 | Gaultier et al. | 200/6 A |
| 5,555,004 | 9/1996 | Ono et al. | 345/161 |
| 5,847,696 | 12/1998 | Itoh et al. | 345/163 |

*Primary Examiner*—Mark R. Powell
*Assistant Examiner*—Thomas J Joseph
*Attorney, Agent, or Firm*—Michael E. Mauney

[57] ABSTRACT

A cursor control device with four (4) pins in an orthogonal array supported by elongated beams. Mounted above the pins is a palm shaped surface. When the palm shaped surface is depressed, it presses downward on one or more of the orthogonal pins which deflect the supporting beams downward toward a light emitter and sensor. The deflection of the beam changes the intensity of the light reflected off the beam which is sensed by the light sensor resulting in a change in electrical signal which is used to control cursor movement on a computer display.

12 Claims, 7 Drawing Sheets

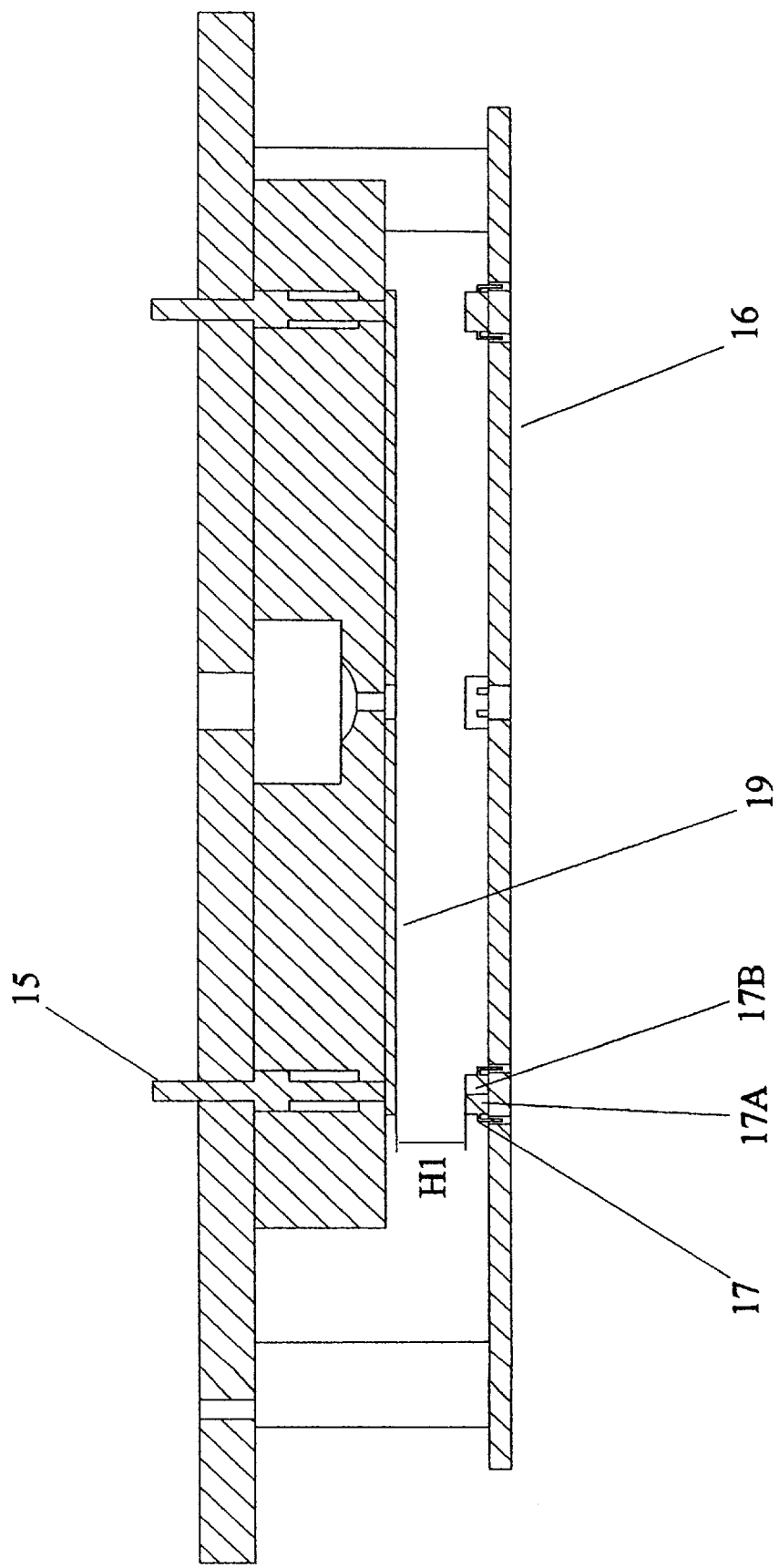

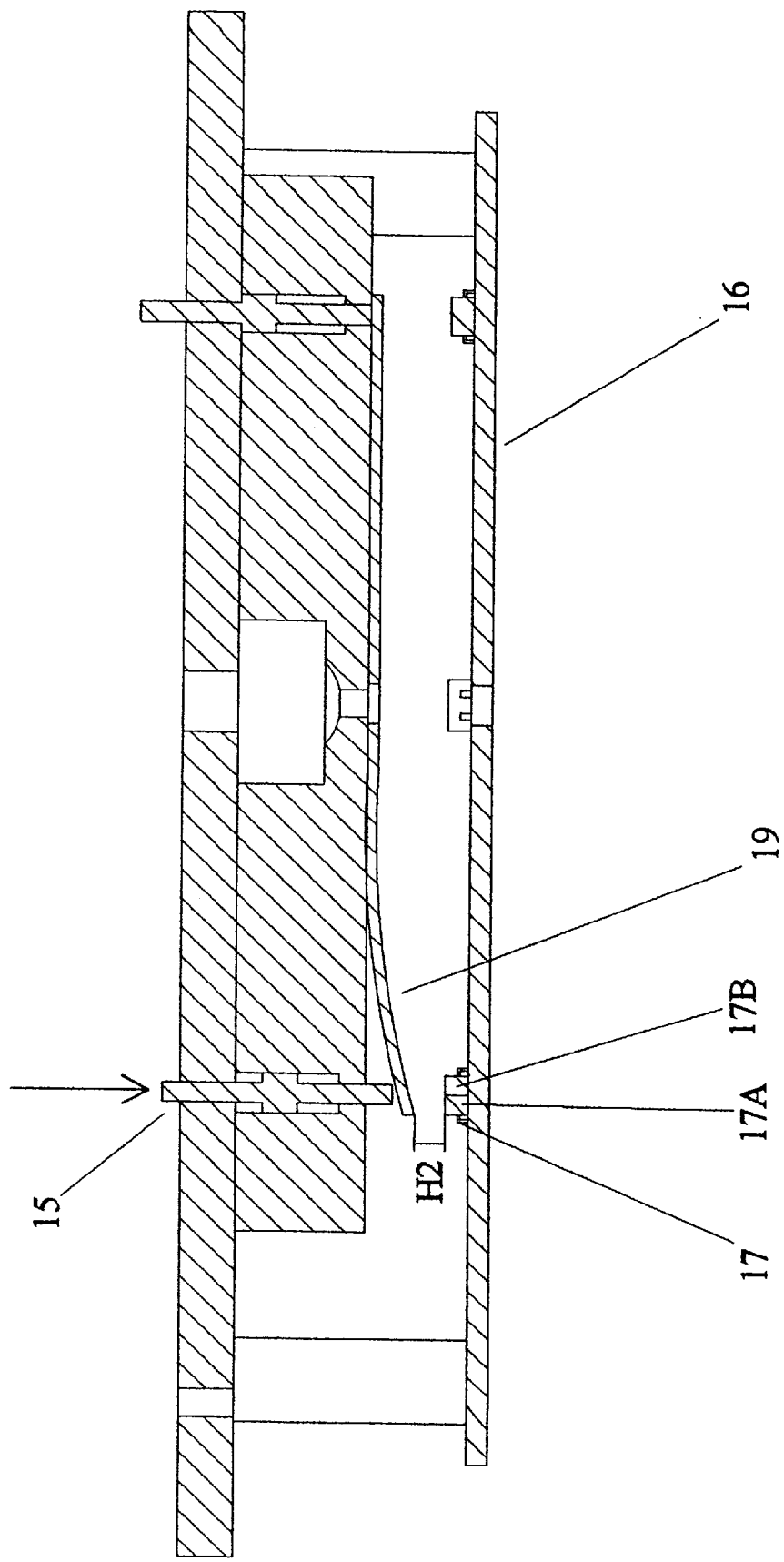

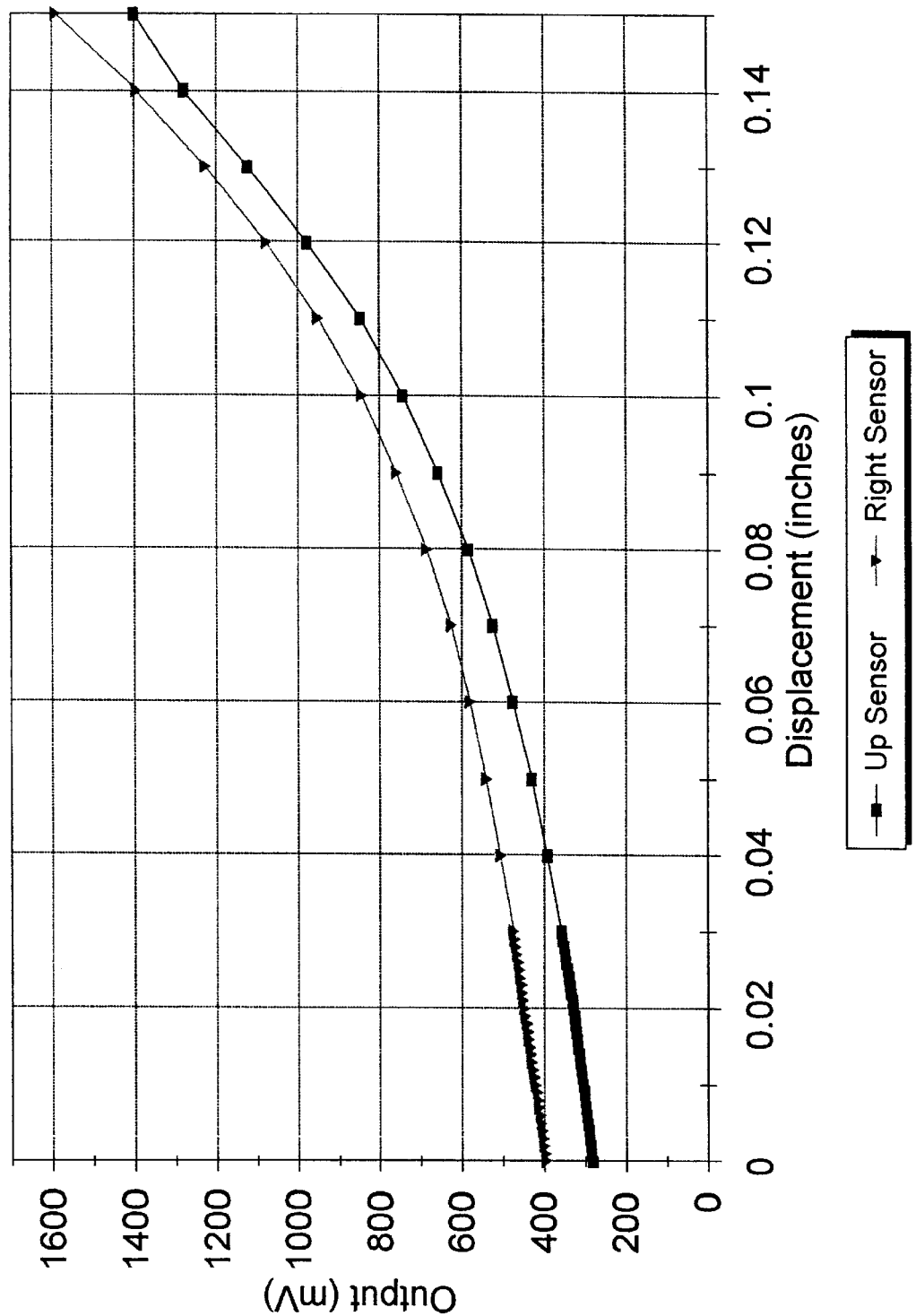

INPUT DEVICE FOR CONTROLLING CURSOR MOVEMENT ON THE SCREEN OF A COMPUTER

BACKGROUND OF THE INVENTION

The present invention relates to input devices for control of a cursor on a personal computer. More particularly, it relates to a cursor control device which does not require movement of the device to actuate movement of the cursor, and which is suited for use in an industrial environment.

DESCRIPTION OF RELATED ART

Most personal computers use a screen to provide feedback to the user of the computer of the work the computer is doing. Typically, there is a cursor on the screen which can be used in conjunction with an input keyboard to control the operation of the work of the computer program. One way of controlling cursor movement are arrow keys that are commonly found on a computer keyboard. Typically, these are keys that point along an X/Y axis. Pushing an arrow key will move the cursor in the direction of the arrow on that key. Typically, the keys are oriented up/down and left/right from the perspective of the user. These keys only move the cursor in one direction. Hence, the cursor will not move on a diagonal line. Additionally, most arrow keys do not allow the user to control the velocity of movement of the cursor.

A second type of cursor control device that is commonly used is a computer "mouse". Ordinarily, a mouse tracks the movement of a user's hand as the user moves the mouse on the surface of a "mouse pad" which is next to the keyboard input to the system. One or more buttons may be positioned on the mouse to allow the user an option of performing other functions by pressing the buttons positioned on the mouse. One way of operating a mouse is to employ a floating ball that turns potentiometer shafts to encode motion along perpendicular axes into analog signals. The floating ball is positioned in the bottom of the mouse to have contact with the mouse pad. As the mouse is moved, the ball rotates activating the potentiometer shafts. However, these mechanical moving parts of the mouse, such as the floating ball may become dirty. Then it may slip on the mouse pad, rather than providing a continuous input, or if the surface of the floating ball becomes dirty, it may get dirt onto the potentiometer shafts, causing the shafts to fail. In home applications this is usually not a major problem, but in business application, especially applications involving industrial use, the necessity of having a ball that communicates with the outside to activate the potentiometers often leads to dirt or other environmental materials fouling the potentiometers. This can lead to inaccurate translation of the mouse motion into cursor motion or even malfunction of the move.

A different type of device to control cursor motion, but related to a mouse is a "track ball". This ordinarily consists of an upwardly facing spherical ball in a housing. The ball may be rotated in any direction. Potentiometers or other sensing devices sense the motion of the ball which is used to control the cursor on the graphic screen. The track ball housing itself is usually motionless. Considerable movement of the track ball is required to effectuate large cursor movements on the screen. Additionally, as with the mouse, the rotation of the ball from the outside environment to the internal part of the track ball housing where sensing devices are located leads to a potential of dirt or other environmental materials fouling the sensing devices. As with the mouse, these outside contaminants can lead to inaccurate translation of the motion of the track ball cursor motion or into mechanical malfunction.

Another method of controlling a cursor's movement is by a touch pad which corresponds to a graphic screen. By touching a location on the touch pad, the user directs the cursor to the corresponding point on the graphic screen. As with the track ball, considerable finger motion is required to move the cursor long distances on the screen and accurate positioning of the cursor on the screen can be limited because of the relative insensitivity of the touch pad.

Another type of technology that has attempted to solve some of the unmet needs in existing cursor control technology use optical means to control movement of the cursor. Often these types of "optical mouses" involve a light emitting unit directed to a reflective marked pad. The light emitted from the emitting unit reflects off the pad into a light sensing unit contained within the mouse as the mouse is moved across the marked pad. An example of this type of device is Williams et al, U.S. Pat. No. 4,751,505. Similar technology is seen in Kwang-Chien, U.S. Pat. No. 4,880,967. The requirement of a marked pad is a drawback to the above mentioned devices. A coherent light source may be used to detect motion across the surface even if the surface itself is not specifically marked. An example of a device using a coherent light source for an optical mouse is seen in Jackson, U.S. Pat. No. 4,794,384.

Despite all of the above work, there is still room in the field for a cursor control device that do not have drawbacks of earlier devices. Therefore, it is an object of the present invention to have a cursor control device which is simple and intuitive to operate, and easy to construct of durable inexpensive materials. It is an object of this invention for this cursor control device to allow the operator to move the cursor in a diagonal direction, not simply on an X or Y axis. It is an object of this invention to allow the controller of the device to control the speed of the movement of the cursor. It is an object of this invention that the cursor control device may be operated leaving at least two fingers free for operation of buttons for further input into the computer. And it is an object of this invention to be resistant to fouling by environmental contaminants so that it may be used in industrial or other demanding environments.

SUMMARY OF THE INVENTION

The current invention has a roughly palm shaped control surface which is pivotally mounted at the center of the circle. Along the circumference of the palm control surface, spaced apart by 90 degrees of arc of the circle, are pins that project downward from the inward surface of the circular control surface. These pins enter into a housing. The pins are of a general rod-like shape and are quite small in comparison to the control surface. Ordinarily, these pins would be somewhat larger in diameter than the lead of a pencil. In proximity to the control surface are one or more button controls to be used in the standard matter with the cursor control device. The operator places his palm on the control surface. He can apply pressure against the control surface, which causes it to pivot in the direction of the pressure, respectively causing the pins mounted in the direction of the pressure to be pushed down into the housing.

Contained within the housing are means for sensing the motion of the activator pins. In the preferred embodiment of this invention, there are two elongated beams perpendicular to each other that intersect below the pivoting center of the control surface and terminate just below the pins that are attached to the underside of the pivoting surface. Each of the pins are the same length and are supported by the beams. The beams are made of some flexible resilient material, such as stainless steel, or the like. Immediately below the points where the pins rest on each beam, but at a distance from the surface of the beam, an optical emitter and sensor are mounted. While the unit is in operation the optical emitter continuously emits a light source which is reflected off the beam and received by the optical sensor. As the operator of the device places pressure on one side of the device, it forces the beam, mounted below the pin which is receiving the pressure, in a downward direction toward the optical emitter and sensor. As the beam approaches the optical emitter and sensor, the intensity of the light reflected off the beam is increased which is detected by the sensor and translated into an appropriate signal for control of the cursor movement. The only outside communication between the interior of the housing and the environment in which the cursor control device is placed are the four small diameter pins. These ordinarily will enter the housing through resilient seals which entirely encircle the pins. If dust, dirt, or other environmental contaminants do happen to settle on the pins, then the general pressure exerted by the seal will clean the surface of the pins, meaning that very little of the dirt or other environmental contaminants that may be on the pins will be transmitted in to the housing of the device.

The more pressure that is applied to the palm control surface along one direction will result in a greater deflection of the underlying beam. The closer the beam approached the emitting light source and aligned sensor, then the greater the intensity of the light reflected to the sensor. The sensor is able to sense this difference and its signal is increased accordingly. This means that one can control not only the direction of the movement, but also the speed of the movement by applying more pressure for faster movement.

This cursor control device is easily constructed and is simple to operate. The interior of the device is almost entirely sealed from the environment, thus, is not easily fouled by environmental contaminants. The device is ordinarily operated by the palm of the operator, leaving fingers free for operation of buttons or other computer input devices that are in proximity to the palm shaped surface. Both the direction and the speed of the cursor can be controlled by varying the direction and intensity of the pressure placed on the circular control surface by the palm of the operator. The only moving parts within the interior of the device are the perpendicular resilient beams. These are not easily fouled by outside contaminants. The light emitting source and the aligned light sensor have no moving parts and are not dependent on fine moving mechanical parts which are easily fouled. The light emitting source and light sensor are fixed in location and resistent to damage from bumps or other sudden motion. This device is useful for all computers but particularly suited for industrial or military applications where stressful operating environments are common.

BRIEF DESCRIPTION OF THE DRAWINGS

FIGS. 4(a) and 4(b) show the current invention in a side cut-a-way view with FIG. 4(a) showing the device at rest and FIG. 4(b) showing the device in use.

FIG. 5 is a graph showing the displacement of the pins in hundredths of inches versus the output of the signal generated by the motion of the pins in millivolts.

DETAILED DESCRIPTION OF THE DRAWINGS

Figure 1:
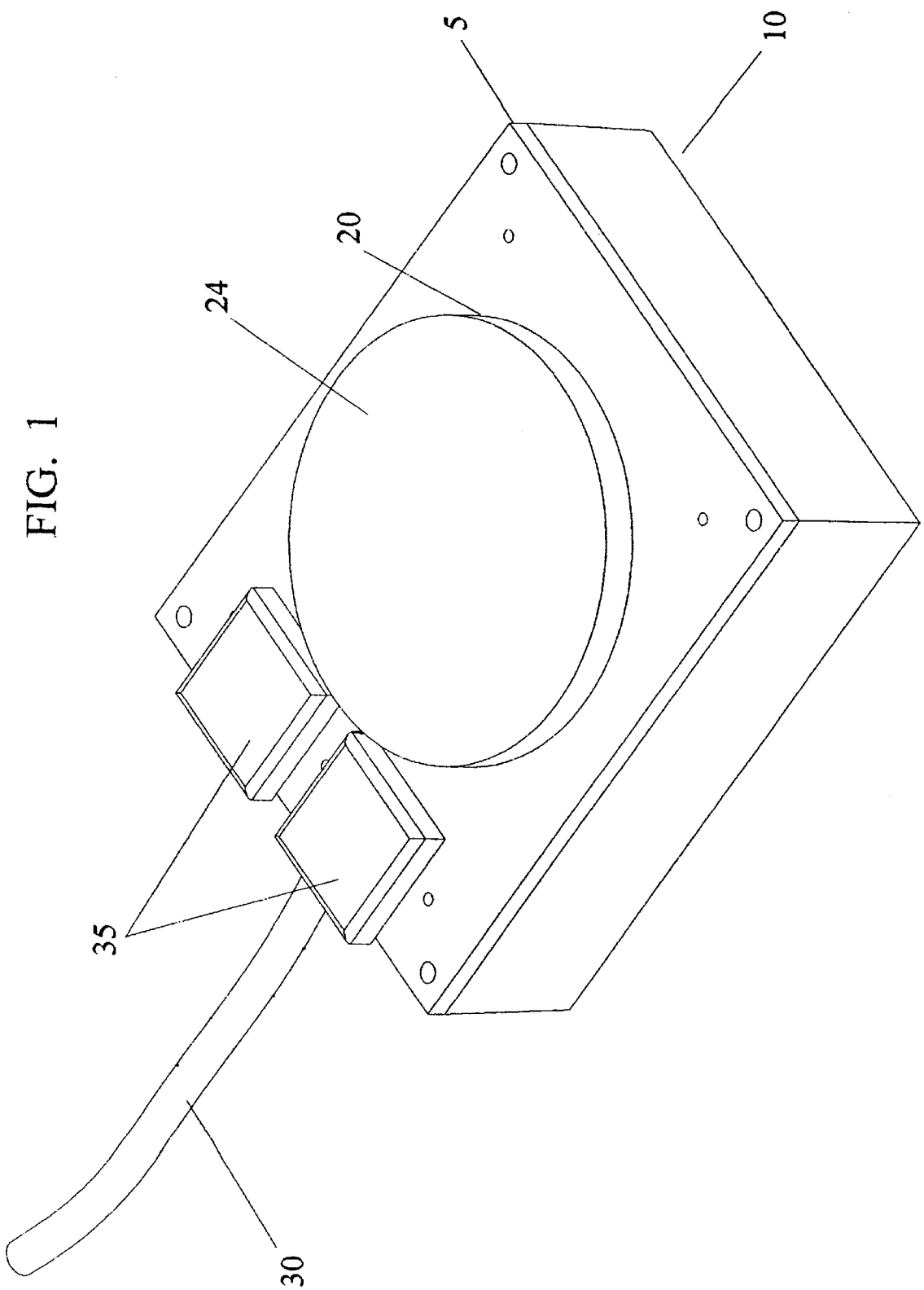
FIG. 1 is the current invention seen from a viewer's perspective from above and at a slight angle.

FIG. 1 shows the computer input device (5) when seen from above and at a slight angle by a potential user. Most computers now operate by a graphical user interface. This is a type of operating system uses specific graphical symbols to allow the user to interact with the programs loaded into the computer. This graphical user interface controls the operation of the computer and of its software. Typically, a graphical user interface uses menus, command structures, and the like. The user of the computer views the screen where the menus are displayed. He moves the cursor visible on the screen to a particular menu or command structure. Once the cursor is pointed at a control function or menu, then a secondary switch is initiated which may cause the command to execute its function or it may cause a menu to display a series of possible functions (a pull down menu), or the like. Thus,the user controls the computer by manipulating the cursor and by initiating switches. Therefore, almost any cursor control device usually has a way of controlling the movement of the cursor and at least one button switch for activating menus, commands, or the like.

Referring now to FIG. 1, the computer input device (5) consists of three major elements. First, there is the housing (10). Second, there are the switches (35). Most computer control devices have one or more switches. The switches here are placed on the housing at the cord (30) end of the housing. However, the switches (35) could be placed along the sides of the housing (10) or on the cursor control surface (20). Two switches (35) are shown on the current invention. Third, is the cursor control surface (20). It is generally a rounded palm shape. The upper surface (24) of the cursor control surface (20) is of a general hemispherical shape, which will be seen more clearly in a cut-a-way view in FIG. 3. This computer input device (5) is ordinarily stationary, unlike a conventional mouse or other control devices which require movements across a marked or unmarked mouse pad. There must be means for transmitting the commands generated by the computer input device (5) to the computer itself. This can be by infrared signals but, more commonly, it is done by a cord (30) which connects to an input or serial port on the back of the computer.

Figure 2:
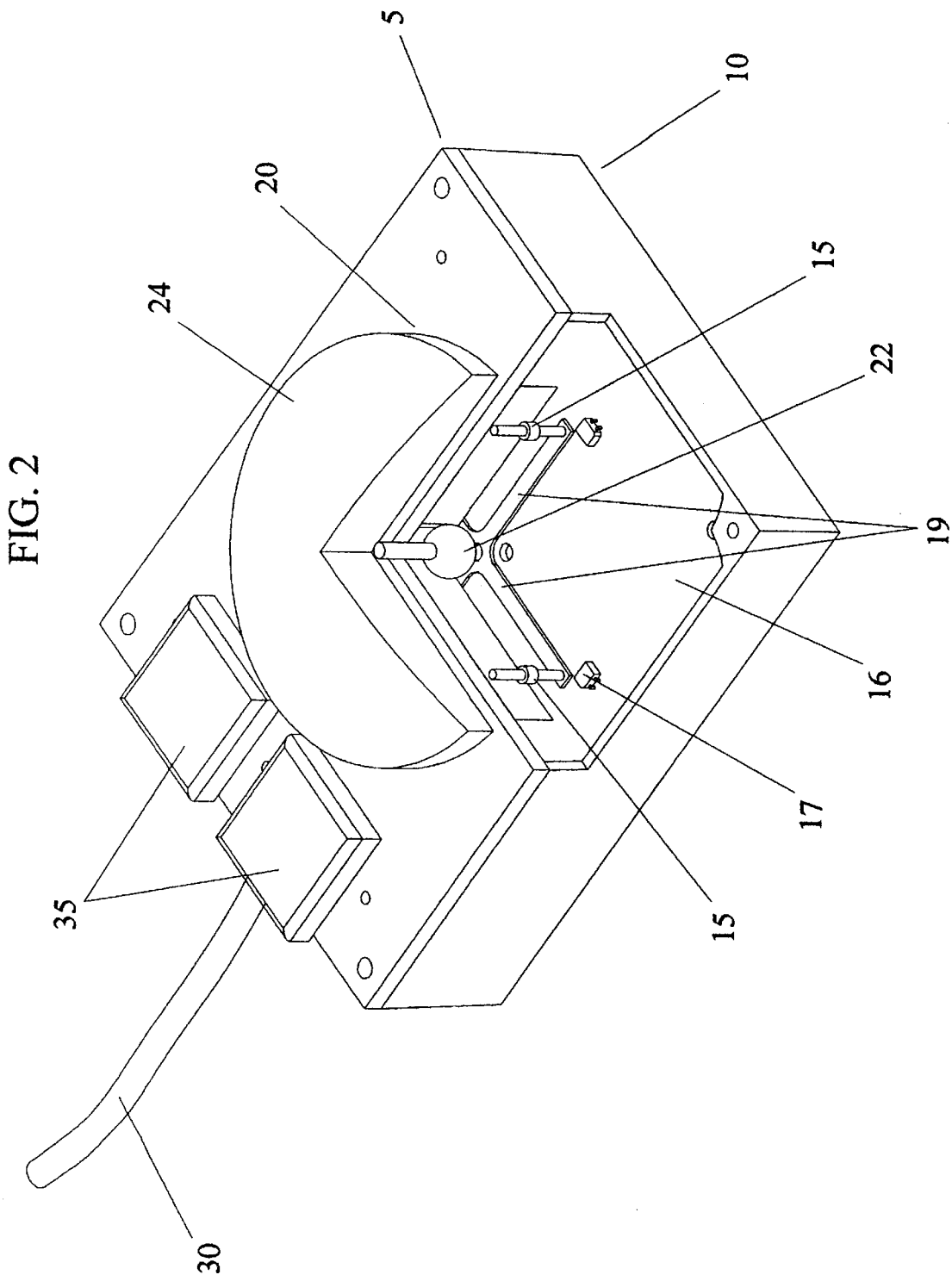
FIG. 2 is the current invention seen from the viewer's perspective from above and at a slight angle with one quadrant of the invention shown cut-a-way so that the interior may be viewed more clearly.

FIG. 2 is a prospective cut-a-way view along a quadrant of the housing (10) to show the interior of the computer input device (5). The cursor control surface (20) is pivotally mounted on a pivot mount (22). This allows the circumference of the cursor control surface (20) to move in a downward direction from a resting position toward the housing (10) throughout a 360° arc. As the cursor control surface (20) moves downward toward the upper surface of the housing (10), it pushes the pins (15) down that are located nearest to the point of greatest downward motion of the cursor control surface (20). Within the housing (10) there are fixedly mounted elongated beams (19), perpendicular to each other, which constitute two perpendicular axis that intersect at a central mounting point usually below the pivot mount (22). At the ends of each beam (19) are the four pins (15) located at 90° intervals along the circumference of the cursor control surface (20). The preferred embodiment uses four pins (15). However, as few as two pins could be used if cost of the device was the primary consideration. More than four pins could be used if controlling especially small movements of the cursor was desired in a particular application. The beams (19) are constructed of flexible resilient material that provide a spring-like pressure against the pins (15) to hold them into place against the underside of the cursor control device (20). In the cut-a-way view in FIG. 2, two of the four pins (15) are shown along with two of the four beams. Not shown are the beams (19) and pins (15) that are respectively 180° opposite from the beams (19) and pins (15) shown.

In ordinary use, the user will rest the palm of his hand on the hemispherical shaped upper surface (24) of the cursor control surface (20) with the fingers of his hand oriented so that they may easily operate the switches (35). The upper surface (24) may take a variety of shapes, including an elongated palm shape, depending on the ergonomics and the preference of the user. Typically, although not necessarily, the pin (15) located underneath the palm of the user closest to the fingers would actuate cursor motion from the bottom to the top of the screen. The pin located underneath the palm closest to the wrist and opposite from the fingers would typically cause cursor motion in the opposite direction, that is, from the top toward the bottom of the screen. Likewise, left and right motion would be actuated by the left and right pins spaced respectively 90° from the top and bottom pins. If the user wanted to cause the cursor to move in a direction from the middle of the screen directly toward the bottom of the screen, then he would press with the palm of his hand on the cursor control surface (20) so that the pin (15) furtherest from the switches (35) would be depressed. This would require pressure at the base of his palm or the heel of his hand. This would cause the pin (15) located under that potion of the cursor control surface (20) to be pressed downward which would cause the beam (19) to also deflect downward. This downward deflection of the beam (19) causes an increase in the reflected light sensed by the light emitting and sensing sensors (17) which are located in a spaced relationship from the beam (19) and ordinarily immediately below the point on the beam (19) where the pin (15) rests against the beam for upwardly biased resilient support. Ordinarily, a sensor (17) is used for each pin (15). Increasing the number of pins (15) and the number of sensors (17) increases the control over the cursor.

Figure 3:
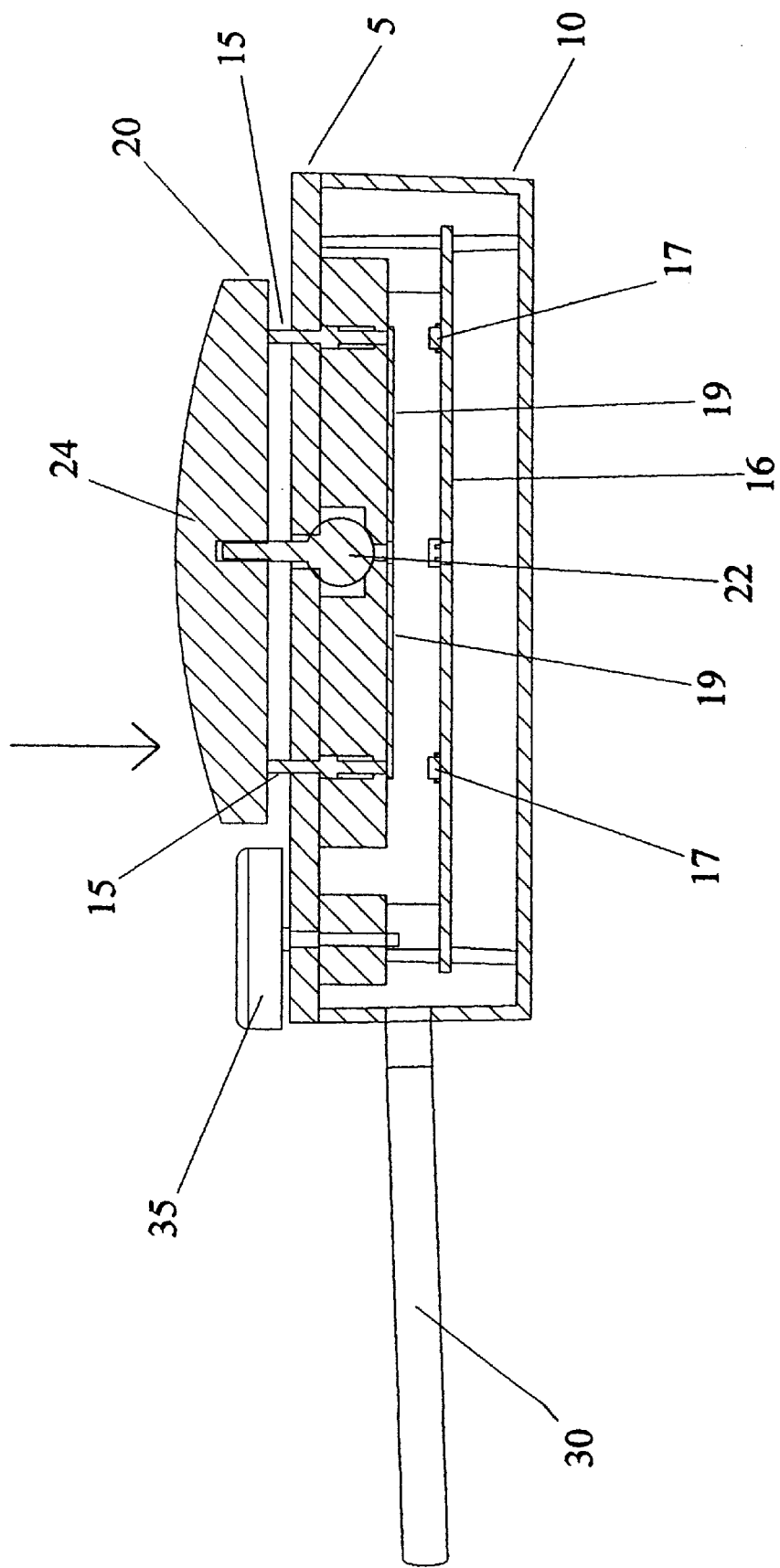
FIG. 3 is the current invention seen from a side cut-a-way view.

FIG. 3 shows the computer input device (5) when seen in a cut-a-way side view. At one end of the device are the switches (35) and the cord (30). The cursor control surface (20) is pivotally mounted on the pivot mount (22) with the pins (15) touching the underside of the cursor control surface (20). The hemispherical shaped upper surface (24) of the cursor control (20) is seen clearly in this cut-a-way view. If a user presses the cursor control surface (20) in the direction shown by the arrow, then this depresses the pin (15) below the arrow in a downward direction so that it forces the beam (19) on which the pin rests and which resiliently supports the pin also in a downward direction, moving the surface of the beam (19) closer to the sensor (17) located immediately below the resting point on the beam (19) of the pin (15). This motion of the beam (19) activates the sensor (17) because of the change in the intensity of the light reflected from the light emitting source (17a) (shown in FIG. (4a) in the sensor (17). This causes a change in the signal which, after appropriate translation, can be used to control the movement of the cursor on the computer screen.

FIG. 4(a) shows in detail the pin (15), the beam (19), and the sensor (17) at rest. The sensor (17) is fixed in place usually on the base of the printed circuit board (16). The sensor (17) has both alightemitting source (17a) and a light sensor (17b). In FIG. 4(a), the beam (19) is in its resting position. It is constructed of a resilient flexible material, such as stainless steel. It provides support for each of the pins (15) which rests against the underside of the cursor control surface (20) (not shown). Pressure is exerted on the cursor control surface (20) so that the pin (15) is pushed in a downward direction, as is shown by the arrow in FIG. 4(b). In the resting position it is separated from the sensor (17) by a distance (H1). As the pin (15) is pushed downward, necessarily deflecting the beam (19) downward, it makes the distance between the under surface of the beam (19) and the sensor (17) closer shown as H2 in FIG. 4(b). Therefore, more light is more directly reflected from the light source (17a) to the light sensor (17b).

The pins (15) respond to the motion of the user's hands by moving up or down in a vertical direction. In the embodiment shown a light emitter and a light sensor are used to translate the vertical motion of the pins as it affects the distance between the light emitter (17a) and light sensor (17b) and the beam (19) into an electrical current with varying voltages. However, a variety of other technologies could be used to sense the motion of the pins and to translate that motion into a signal for control of a cursor on a computer screen. For example, potentiometers could be activated by the movement of the pin. Strain gauges could be used to sense the motion of the beam caused by the vertical motion of the pin. An electrical phenomenon known as the "Hall effect" could also be used to detect the vertical motion of the pins (15). However, it is believed that a light emitter (17a) and sensor (17b) have advantages over these technologies. First, there are no moving parts directly connected to the motion detecting function, unlike a potentiometer. Secondly, the technology for light emitting and sensing is well developed, widely available, and widely understood by those of ordinary skill in the art in this field. The light emitter (17a) ordinarily is an electroluminescent diode, usually called a "light-emitting diode", abbreviated LED. LED's are widely used in a variety of technical applications, but certainly in computers. LED's emit light in a variety of spectra, including infrared light, sometime called an "infrared emitting diode", or IED. Diodes are produced that emit a coherent light. These are called "laser diodes." The light sensor (17b) is a photodiode or a phototransistor. A phototransistor differs primarily from a photodiode in that the photoelectric current is multiplied internally in a phototransistor. A phototransistor may be equipped with a third or base lead when a phototransistor is used as a switching device.

Manufacturers sometimes build both a light emitter and a light sensor together. Names for such a device in the trade are "Photointerrupters", and "Optical Reflective Sensors". Other names are common. It has been found in practice that a Photointerrupter manufactured by Sharp and assigned the product number GP2S10 can be effectively used in this device.

FIG. 5 shows a graph of the vertical displacement of the cursor control surface versus the output in volts using the Sharp GP2S10 photointerrupter as the light emitter (17a) and the light sensor (17b). The X-axis of the graph is the displacement in hundredths of an inch in a downward direction of the cursor control surface (20). The output controlled by the pin at the 12 o'clock position from the user's perspective, which controls movement of the cursor from the bottom of the screen toward the top of the screen or in the "up" direction, is shown by square points. The response line for the output controlled by the pin on the user's right, which moves the cursor from the left to the right side of the screen, is shown by the triangular markings on the X-axis. The Y-axis on the graph is the output in millivolts of the signal generated by the photointerrupter respectively placed under either the "up pin" shown as squares on the graph or the "right pin" shown as triangles. As can be seen from FIG. 5, the output is not strictly linear. The voltage changes shown in FIG. 5 must be translated into a signal suitable for input into the central processing unit of the computer by a serial port Different types of computers use different mouse control protocols. The most common is the 3-Byte/two button Microsoft protocol.

Figure 6:
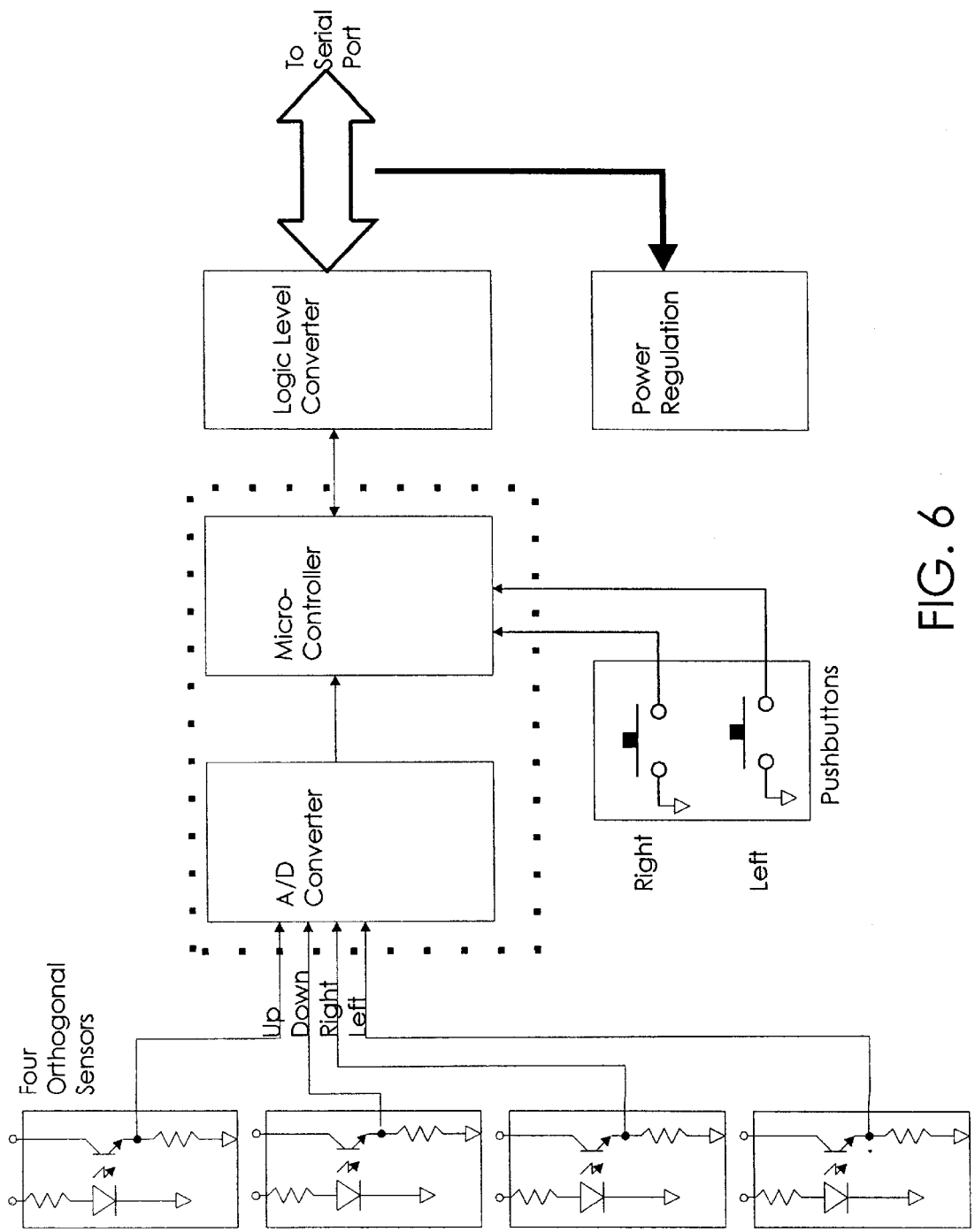
FIG. 6 is a flow chart demonstrating how the voltage output from the sensors is converted to a signal for transmission to a serial port on a computer.

FIG. 6 shows in a flow chart how the voltage output from the sensors, as shown in FIG. 5, are fed into an A/D converter, into a microcontroller, and into a logic level converter for translation into a signal suitable for transmission to a serial port for a computer. The AID converter may be programmed so that the signal sent to the computer for control of the cursor is directly proportional to the displacement of the cursor control device (20). This will require a gain adjustment function within the A/D converter and microcontroller within the input device.

The motion required to control the cursor in this computer input device is somewhat different than the motion in a standard mouse which is moved across a mouse pad. However, it takes approximately as long to learn to use this computer input device as to learn to use a standard mouse. This computer input device is easily manufactured of widely available materials, but is very durable, can be used in environmentally stressful environments, and will have wide applications in industrial and military uses and for people who, for whatever reason, are not comfortable using a standard mouse. It will be recognized by one of ordinary skill in the art that variations in materials and apparatus employed in the above description may be made, but without departing from the spirit of this invention. The detailed description above is not intended as a limitation on the scope of the invention, which is limited only by the claims that follow.

What is claimed is:

1. A computer input device for cursor control on a computer display comprising:
   (a) at least three (3) pins;
   (b) means for resiliently biasing each of said pins for perpendicular movement to a plane defined by steady resting points for each of said pins;
   (c) a rigid surface positioned above said pins whereby a user may exert pressure against said rigid surface resulting in perpendicular movement of at least one of said pins;
   (d) means for sensing said perpendicular movement of any of said pins and producing a signal in response to said movement of any of said pins;
   (e) means for translating said signal into a cursor control command protocol and transmiting said cursor control command to a computer whereby the cursor movement on a computer screen is controlled.

2. A computer input device for cursor control on a computer display as recited in claim 1 wherein there are four (4) pins.

3. A computer input device for cursor control on a computer display as recited in claim 2 wherein said four (4) pins are in an orthogonal array where lines connecting each pin to an immediately adjacent pin form a square.

4. A computer input device for cursor control on a computer display as recited in claim 3 wherein said means for resiliently biasing each of said pins is an orthogonal cross-like structure having four (4) beams extending from a central mounting point with each of said four (4) pins resting on an apex of one of said orthogonal beams.

5. A computer input device for cursor control on a computer display as recited in claim 4 wherein said rigid surface is a palm-shaped structure having a planar lower surface and a hemispherical upper surface with said planar lower surface positioned immediately above said four (4) pins.

6. A computer input device for cursor control on a computer display as recited in claim 5 wherein said means for sensing said movement of any of said pins is a photo-interrupter.

7. A computer input device for cursor control on a computer display comprising:
   (a) an enclosed housing;
   (b) at least three (3) pins mounted in said housing where a first end of said pins is enclosed within said housing and a second end of said pins is outside of said housing;
   (c) means for resiliently biasing each of said pins for perpendicular movement to a plane defined by steady resting points for each of said pins, said means for resiliently biasing enclosed within said housing;
   (d) a rigid surface positioned above said second end of said pins and positioned outside of said housing whereby a user may exert pressure against said rigid surface resulting in perpendicular movement of at least one of said pins;
   (e) means for sensing perpendicular movement of any of said pins and producing a signal in response to movement of any of said pins;
   (f) means for translating said signal into a cursor control command protocol and transmitting said cursor control command protocol to a computer whereby the cursor movement on a computer screen is controlled.

8. A computer input device for cursor control on a computer display as recited in claim 7 wherein there are four (4) pins.

9. A computer input device for cursor control on a computer display as recited in claim 8 wherein said four (4) pins are in an orthogonal array where lines connecting each pin to an immediately adjacent pin form a square shape.

10. A computer input device for cursor control on a computer display as recited in claim 9 wherein said means for resiliently biasing each of said pins is an orthogonal crosss-like structure having four (4) beams extending from a central mounting point with each of said four (4) pins resting at an apex of one of said orthogonal beams.

11. A computer input device for cursor control on a computer display as recited in claim 10 wherein said rigid surface is a palm shaped structure having a planar lower surface and a hemispherical upper surface with said planar surface positioned immediately above said four (4) pins.

12. A computer input device for cursor control on a computer display as recited in claim 11 wherein said means for sensing said movement of any of said pins is a photo-interrupter.

* * * * *